United States Patent
Kim (10) Patent No.: US 8,879,991 B2
(45) Date of Patent: Nov. 4, 2014

(54) SHORT-RANGE WIRELESS COMMUNICATION APPARATUS AND METHOD FOR ESTABLISHING CONNECTION THEREOF

(75) Inventor: Hyeong Seok Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 673 days.

(21) Appl. No.: 13/113,473

(22) Filed: May 23, 2011

(65) Prior Publication Data

US 2012/0178369 A1 Jul. 12, 2012

(30) Foreign Application Priority Data

Jan. 10, 2011 (KR) ........................ 10-2011-0002255

(51) Int. Cl.
*H04B 7/00* (2006.01)
*H04W 4/04* (2009.01)
*H04W 4/00* (2009.01)

(52) U.S. Cl.
CPC .............. *H04W 4/043* (2013.01); *H04W 4/008* (2013.01)

USPC ......................................................... 455/41.2

(58) Field of Classification Search
CPC ...................................................... H04W 84/20
USPC ....................................... 455/41.2, 414.1, 466
See application file for complete search history.

(56) References Cited

U.S. PATENT DOCUMENTS

2007/0123166 A1* 5/2007 Sheynman et al. .......... 455/41.2
2009/0181653 A1* 7/2009 Alharayeri ................. 455/414.1

* cited by examiner

*Primary Examiner* — April G Gonzales
(74) *Attorney, Agent, or Firm* — Cha & Reiter, LLC (57) ABSTRACT

A short-range wireless communication apparatus and method establish a connection thereof by simply selecting a connection target through a camera and providing an identifiable image of a target. In the method, the apparatus captures an identifiable image of a connection target device and recognizes identifiable information corresponding to the captured identifiable image. Then the apparatus either automatically selects or in conjunction with user approval selects the connection target device corresponding to the recognized identifiable information and establishes a connection with the selected target device through a short-range wireless communication.

20 Claims, 5 Drawing Sheets

SHORT-RANGE WIRELESS COMMUNICATION APPARATUS AND METHOD FOR ESTABLISHING CONNECTION THEREOF

CLAIM OF PRIORITY

This application claims priority under 35 U.S.C. §119 from Korean Patent Application KPA No.: 10-2011-0002255 filed Jan. 10, 2011, the contents of which are incorporated by reference herein in its entirety.

BACKGROUND OF THE INVENTION

1. Field of the Invention

The present invention relates generally to a short-range wireless communication technology. More particularly, the present invention relates to a short-range wireless communication apparatus and method for establishing a connection between devices.

2. Description of the Related Art

A short-range wireless communication typically refers to a communication for the exchange of information between information processing devices at a short distance from each, using a radio wave as a transmission medium of information. In the past, a short-range communication was a wired communication that requires a wired connection between communication devices. However, due to some advancement in wireless communication, and the associated advantages such as mobility, easiness of installation and expansion, etc., a short-range wireless communication is widely used nowadays.

Known as examples of a short-range wireless communication protocols include Bluetooth, NFC (Near Field Communication), ZigBee, RuBee, a wireless LAN (Local Area Network), and the like. Nowadays, data transmission/reception technologies using the above-mentioned short-range wireless communication are increasingly popularized.

For instance, Bluetooth technology is currently used in several fields including a Bluetooth-based data transmission, and audio transmission using a Bluetooth earphone, a Bluetooth earset, and a Bluetooth-based device control, as well as video transmission.

When a user selects a Bluetooth function in a device that supports Bluetooth operation and the particular function, the device displays a list of peripheral Bluetooth devices that can potentially communicate with the user. A user selects one of the displayed devices, and the device performs a Bluetooth communication through a connection with the selected device. This type of display and selection is adequate when there are not many of Bluetooth devices within communication range. However, as the number of Bluetooth available devices including various mobile devices continues to increase, or the user is in an area such as a stadium or train station where there could be hundreds of users with Bluetooth devices nearby, the aforementioned method of looking at the list of users and selecting may often cause many problems. That is, too many Bluetooth devices will make it difficult to identify and select a desired one of them. Additionally, since the list of peripheral Bluetooth devices normally uses a Bluetooth address or name only, similar or same addresses or names may often give a user inconvenience in selecting a desired device.

This problem is not limited to Bluetooth devices and may occur even in any other short-range wireless communication devices.

BRIEF SUMMARY OF THE INVENTION

Accordingly, the present invention addresses at least some of the above-mentioned problems and/or disadvantages and offers at least the advantages described below.

An exemplary aspect of the present invention is to provide a short-range wireless communication apparatus and a related connection method that permits a more convenient use of a short-range wireless communication function.

According to one exemplary aspect of the present invention, provided is a method for establishing a connection of a short-range wireless communication apparatus, the method comprising: capturing an identifiable image of a connection target device; recognizing identifiable information corresponding to the captured identifiable image; selecting the connection target device corresponding to the recognized identifiable information; and establishing a connection with the selected target device through a short-range wireless communication.

According to another exemplary aspect of the present invention, provided is a short-range wireless communication apparatus comprising: a camera unit configured to capture an identifiable image of a connection target device; a control unit configured to recognize identifiable information corresponding to the captured identifiable image and then to select the connection target device corresponding to the recognized identifiable information; and a short-range communication unit configured to establish a connection with the selected target device through a short-range wireless communication.

Other exemplary aspects, advantages, and salient features of the invention will become more apparent to those of ordinary skill in the art from the following detailed description, which, taken in conjunction with the annexed drawings, discloses exemplary embodiments of the claimed invention.

DETAILED DESCRIPTION

Exemplary, non-limiting embodiments of the present invention will now be described more fully with reference to the accompanying drawings. This invention may, however, be embodied in many different forms and should not be construed as limited to the exemplary embodiments set forth herein. Rather, the disclosed exemplary embodiments are provided so that this disclosure will be thorough and complete, and will fully convey the scope of the invention to those skilled in the art. The principles and features of this invention may be employed in varied and numerous embodiments without departing from the scope of the invention.

Furthermore, well-known or widely used techniques, elements, structures, and processes may not be described or illustrated in detail to avoid obscuring appreciation of the present invention by a person of ordinary skill in the art. Although the drawings represent exemplary embodiments of the invention, the drawings are not necessarily drawn to scale and certain features may be exaggerated or omitted in order to better illustrate and explain the present invention.

Figure 1:
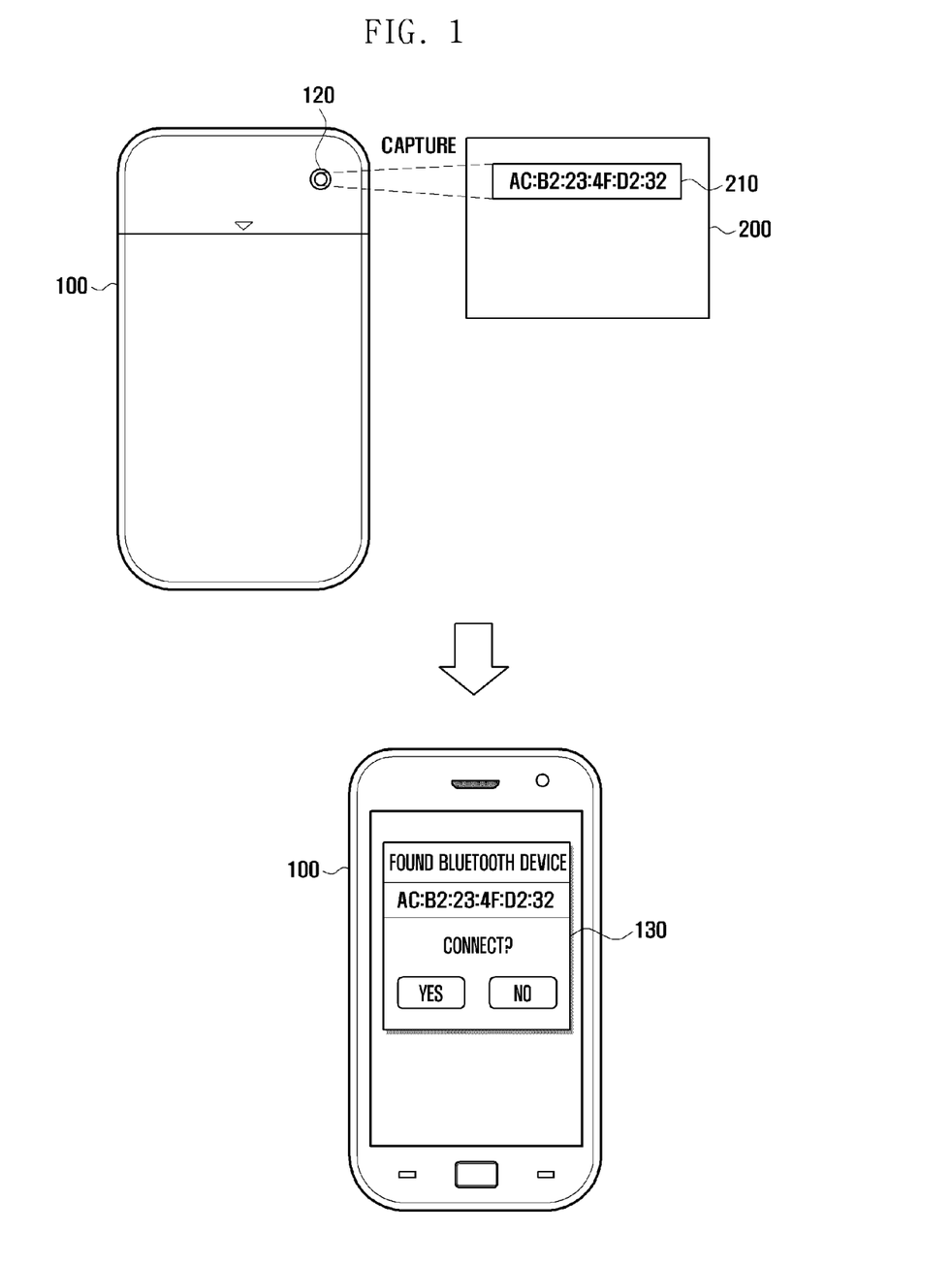
FIG. 1 is a schematic view illustrating an overview of a process of establishing a Bluetooth connection in accordance with an exemplary embodiment of the present invention.

FIG. 1 is a schematic view illustrating a process of establishing a Bluetooth connection in accordance with an exemplary embodiment of the present invention. Although a Bluetooth device is exemplary used herein, any other type of short-range wireless communication apparatus may be alternatively used for the present invention as will be understood by those skilled in the art.

Using a short-range wireless communication function, a user attempts connection with a short-range wireless communication apparatus 100 to a connection target device 200. For a connection, the user takes an identifiable image 210 of the target device 200 by using a camera 120 of the short-range wireless communication apparatus 100 for a type of visual identification of an identifiable image associated with the target device 200. The identifiable image 210 may be, for example, a Bluetooth address or name of the target device 200 in the form of text. Alternatively, a barcode or any other equivalent images corresponding to a Bluetooth address or name may be used as the identifiable image 210. The identifiable image 210 is presented on the surface of the target device 200 or displayed on a display unit 130 of the target device 200. For instance, a sticker-type Bluetooth address is attached onto the front of a Bluetooth printer, or a function to show a Bluetooth address on a display unit is executed in a mobile phone that supports a Bluetooth function.

The short-range wireless communication apparatus 100 recognizes the identifiable image 210 taken through the camera 120 and extracts identifiable information (address or name) from the recognized image. Then the short-range wireless communication apparatus 100 detects a short-range wireless communication signal and searches peripheral devices. If there is a peripheral device that has a Bluetooth address or name corresponding to the identifiable information among the searched peripheral devices, it is offered to the display unit 130 so that a user can select it. In this way, selectively offering the peripheral device via the visually identifiable image 210 allows a user to conveniently connect the short-range wireless communication apparatus 100 to the target device 200.

Figure 2:
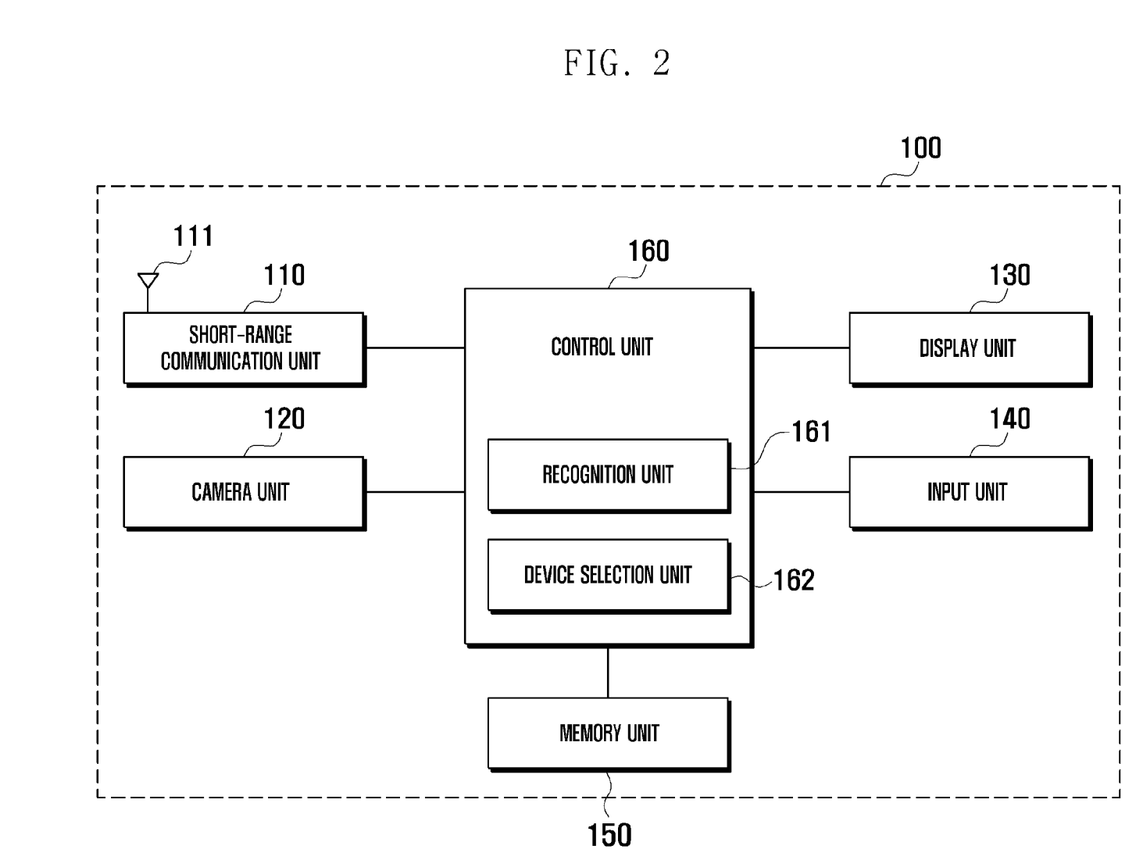
FIG. 2 is a block diagram illustrating the configuration of a short-range wireless communication apparatus in accordance with an exemplary embodiment of the present invention.

FIG. 2 is a block diagram illustrating the configuration of a short-range wireless communication apparatus in accordance with an exemplary embodiment of the present invention.

Referring now to FIG. 2, the short-range wireless communication apparatus 100 may preferably include a short-range communication unit 110, a camera unit 120, a display unit 130, an input unit 140, a memory unit 150, and a control unit 160.

The short-range communication unit 110 preferably performs a function to send or receive data for a short-range wireless communication of the apparatus 100. In case of a Bluetooth communication, the short-range communication unit 110 may be formed of a Bluetooth stack. The short-range communication unit 110 may receive data through a short-range wireless communication channel via an antenna 111 and then send the received data to the control unit 160, and also receive data from the control unit 160 and then transmit data received from the control unit through the short-range wireless communication channel.

The camera unit 120 captures the identifiable image 210 of the connection target device 200 under the control of the control unit 160. The identifiable image 210 refers to a specific image used for identifying or distinguishing the target device 200. For example, the identifiable image 210 may be a Bluetooth address or name in the form of text, or a barcode or any other equivalent images corresponding to a Bluetooth address or name. Normally, the camera unit 120 performs an image-capturing function in response to user instructions. Alternatively, when the identifiable image 210 is recognized within a capturing area, the control unit 160 enables the camera unit 120 to perform an image-capturing function. The camera unit 120 sends the captured identifiable image 210 to a recognition unit 161 of the control unit 160.

The display unit 130 may be formed of LCD (Liquid Crystal Display), OLED (Organic Light Emitting Diode), AMOLED (Active Matrix OLED), or an type of thin-film technology display or any equivalent of any of the aforementioned. The display unit 130 visually offers a menu, input data, function setting information and any other information of the apparatus 100 to a user. The display unit 130 performs a function to output a booting screen, an idle screen, a menu screen, a call screen, or any other application screens of the apparatus 100.

Particularly, under the control of the control unit 160, the display unit 130 according to an exemplary embodiment of the claimed invention may display an address, a name, or any other information of a peripheral device that can be connected through a short-range wireless communication. A list of peripheral devices displayed in the display unit 130 will be described later with reference to FIGS. 4 and 5.

The input unit 140 receives a user input and then sends it to the control unit 160. The input unit 140 may be formed of a keypad and/or a touch sensor. The input unit 130 and display unit 140 may comprise a single touchscreen.

In case where the input unit 140 is formed of a keypad, the input unit 140 receives a user's key manipulation for controlling the short-range wireless communication apparatus 100, creates a corresponding input signal, and then delivers the input signal to the control unit 160. The keypad may be composed of alphanumeric keys and navigation keys disposed at the front side of the apparatus 100, and some function keys disposed at lateral sides of the apparatus 100. If a touch sensor is enough to manipulate the apparatus 100, the keypad may be omitted.

In case where the input unit is formed of a touch sensor, the touch sensor may be formed of touch detection sensors of capacitive overlay type, resistive overlay type or infrared beam type, or formed of pressure detection sensors, just to name some possible types of sensors. Alternatively, any other various sensors capable of detecting a contact or pressure of an object may be used for the touch sensor. The touch sensor detects a user's touch input, creates a detection signal, and transmits the signal to the control unit 160. The detection signal contains coordinate data of a user's touch input. If a touch and moving gesture is inputted by a user, the touch sensor creates a detection signal containing coordinate data about a moving path of touched point and then transmits it to the control unit 160.

The memory unit 150 preferably stores programs and data required for operations of the short-range wireless communication apparatus 100 and may consist of a program region and a data region. The program region may store an operating system (OS) and programs for booting and operating the apparatus 100, applications required for the playback of multimedia contents, and applications required for the execution of various optional functions of the apparatus 100, such as a camera function, a sound reproduction function, an image or video playback function, and in the case of a mobile terminal, "apps" associated with the various different functionalities that can be performed by a mobile terminal, and the like. The data region stores data created while the apparatus 100 is used, such as an image, a video, a phonebook, an audio, etc.

The control unit 160, which typically comprises a processor or microprocessor, performs control functions in order to control the entire operation of the short-range wireless communication apparatus 100.

With continued reference to FIG. 2, particularly, the control unit 160 according to an exemplary embodiment of this invention, includes a recognition unit 161 and a device selection unit 162.

The recognition unit 161 recognizes identifiable information that corresponds to the captured identifiable image 210. Herein, the identifiable information refers to information required for identifying the connection target device 200. For instance, the identifiable information may be a Bluetooth address or name.

The device selection unit 162 selects the connection target device 200 corresponding to the recognized identifiable information. If there are two or more target devices 200 corresponding to a same type of recognized identifiable information, the device selection unit 162 may request a user's selection for the target devices 200. Additionally, even though there is the only one target device 200 corresponding to the recognized identifiable information, the device selection unit 162 may confirm whether a user will select or not the target device 200.

Now, operations of the respective elements of the short-range wireless communication apparatus 100 will be described in detail with reference to FIGS. 3 to 5.

Figure 3:
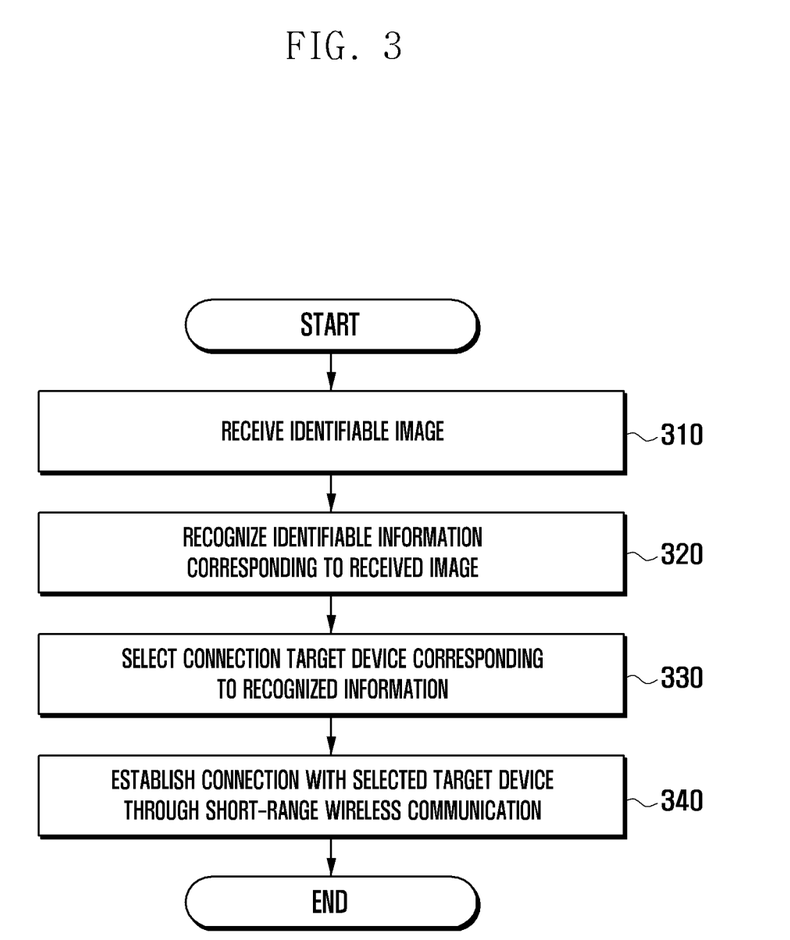
FIG. 3 is a flow diagram illustrating a method for establishing a connection in a short-range wireless communication apparatus in accordance with an exemplary embodiment of the present invention.

FIG. 3 is a flow diagram illustrating a method for establishing a connection in a short-range wireless communication apparatus in accordance with an exemplary embodiment of the present invention.

Referring now to FIG. 3, in step 310, the recognition unit 161 of the control unit 160 receives the captured identifiable image 210 from the camera unit 120. As discussed above, the camera unit 120 captures the identifiable image 210 under the control of the control unit 160. The camera unit 120 may capture an image in the capture area as the identifiable image 210 in response to user instructions such as a press of a capture key or by a touch of a capture icon or even a verbal command. For the above, the short-range wireless communication apparatus 100 may offer a capture interface to a user. The identifiable image 210 may comprise a Bluetooth address or name in the form of text. Also, the identifiable image 210 may comprise a barcode or any other equivalent images corresponding to a Bluetooth address or name of the device or a designated username.

In step 320, the recognition unit 161 recognizes identifiable information that corresponds to the captured identifiable image 210. If the identifiable image 210 is in the form of text, the recognition unit 161 can recognize the identifiable information such as a Bluetooth address or name by using a text recognition module as well known in the art. Also, the identifiable image 210 is in the form of graphic, the recognition unit 161 can convert the identifiable image in a predefined manner stored in memory and then recognize the identifiable information such as a Bluetooth address or name in the form of text.

In step 330, the device selection unit 162 of the control unit 160 selects the connection target device 200 corresponding to the recognized identifiable information automatically. If the recognized identifiable information is a Bluetooth address, a device having the Bluetooth address is selected as the target device 200. In some embodiments, the device selection unit 162 may require a user to finally select the target device 200 among candidates for the target device 200. Also, a user could enter or select an identifiable image from previous communications that is stored in a type of visual address book. A detailed process of the step 330 will be described later with reference to FIGS. 4 and 5.

In step 340, the control unit 160 establishes a connection with the target device 200 through a short-range wireless communication protocol. If the recognized identifiable information is a Bluetooth address, a device having the Bluetooth address is connected through Bluetooth. After a connection is established, any data required for the execution of a particular short-range wireless communication application may be transmitted through a short-range wireless communication.

Figure 4:
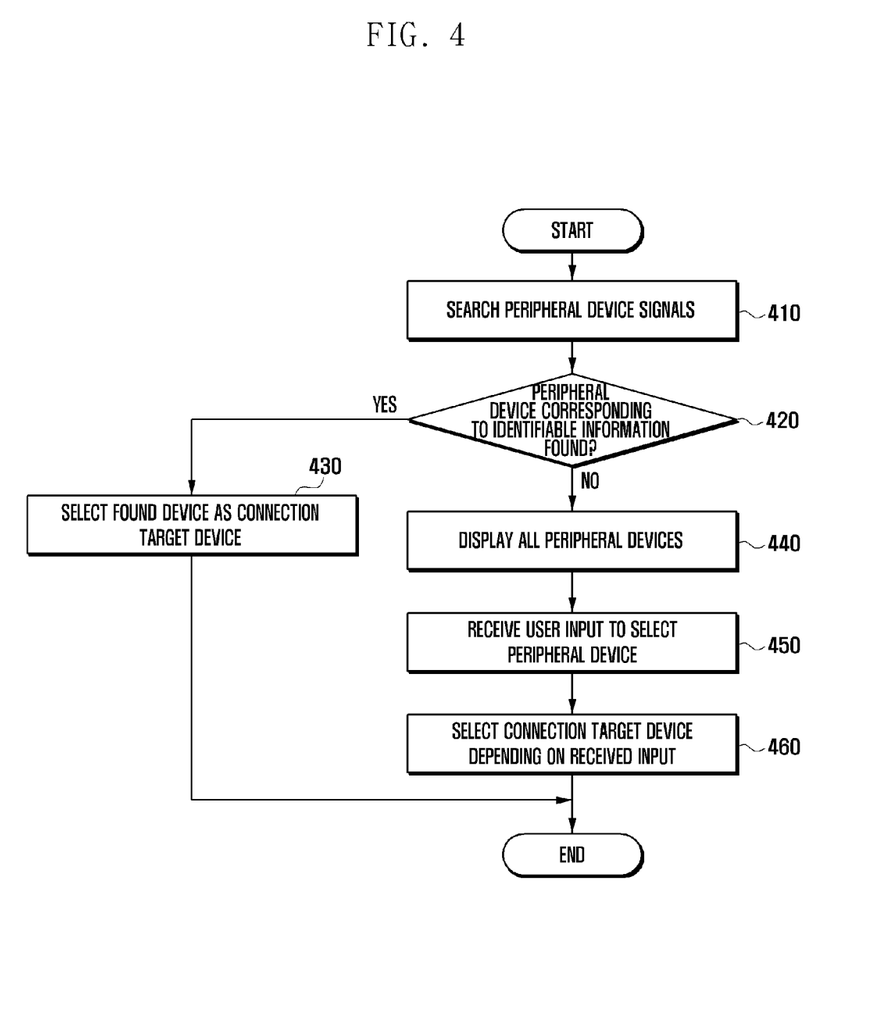
FIG. 4 is a flow diagram illustrating in detail the step 330 of FIG. 3 in accordance with one exemplary embodiment of the present invention.

FIG. 4 is a flow diagram illustrating in detail the step 330 of FIG. 3 in accordance with one exemplary embodiment of the present invention.

Referring now to FIG. 4, in step 410, the control unit 160 searches for peripheral devices by using a short-range wireless communication signal. Namely, the control unit 160 scans connectable peripheral devices by detecting a short-range wireless communication signal. In step 420, the control unit 160 determines whether any peripheral devices correspond to the identifiable information is found. If so, in step 430 the control unit 160 selects the found peripheral device as the connection target device 200. In another embodiment, the control unit 160 may display a list of the found peripheral devices, receive a user's selection in the list, and then determine the target device 200 depending on the received user selection.

If no peripheral device corresponding to the identifiable information is found, then the control unit 160 performs step 440 and displays all the peripheral devices. The display of all the peripheral devices case is caused by errors in recognition of the identifiable image 210 or errors in the identifiable image 210 itself. Therefore, in the step 440, the control unit 160 controls the display unit 130 to display a list of all peripheral devices regardless of their respective identifiable images 210. as a type of safety net in case a certain peripheral device did not previous appear on the display. In step 450, the input unit 140 receives a user's selection input and delivers the selection to the device selection unit 162 of the control unit 160. In step 460, the device selection unit 162 selects a device indicated by a user as the desired target device 200.

Figure 5:
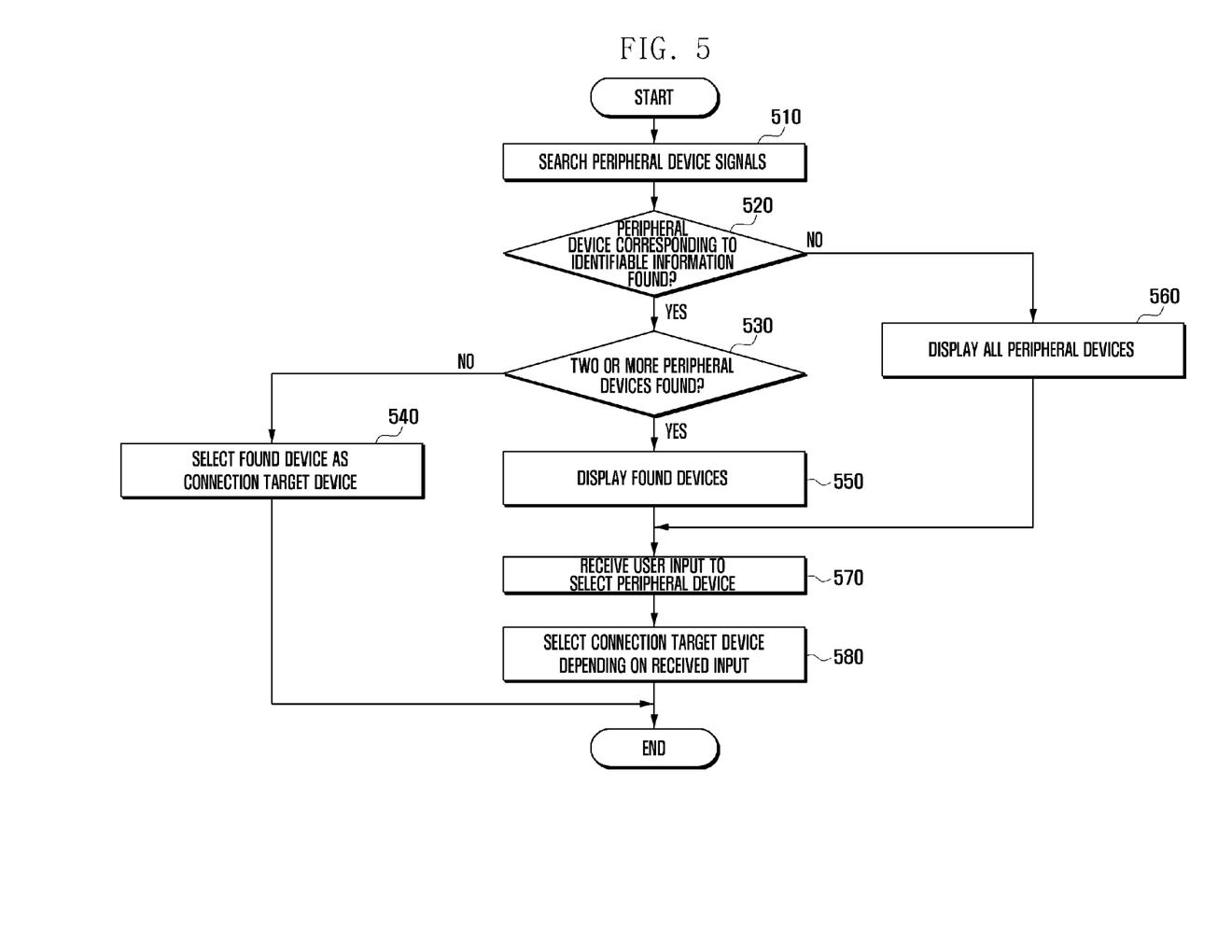
FIG. 5 is a flow diagram illustrating in detail the step 330 of FIG. 3 in accordance with yet another exemplary embodiment of the present invention.

FIG. 5 is a flow diagram illustrating in detail the step 330 of FIG. 3 in accordance with another exemplary embodiment of the present invention.

In step 510, the control unit 160 searches peripheral devices by using a short-range wireless communication signal. Namely, the control unit 160 scans connectable peripheral devices by detecting a short-range wireless communication signal. In step 520, the control unit 160 determines whether any peripheral devices correspond to the identifiable information is found. If so, the control unit 160 performs step 530.

In the step 530, the control unit 160 further determines whether two or more peripheral devices corresponding to the identifiable information are found. If only the one peripheral device corresponding to the identifiable information is found, in step 540 the device selection unit 162 selects the found peripheral device as the connection target device 200. If two or more peripheral devices corresponding to the identifiable information are found, in step 550 the control unit 160 controls the display unit 130 to display a list of the found peripheral devices corresponding to the identifiable information. In step 570, the input unit 140 receives a user's selection input. This selection input may be a choice of the peripheral device in the list or a cancelation of a selection input or the selection process. This selection input may be made through the keypad or touch sensor. In step 580, the device selection unit 162 selects a device selected by a user as the target device 200.

If no peripheral device corresponding to the identifiable information is found in the step 520, the control unit 160 performs step 560 of controlling the display unit 130 to display a list of all peripheral devices regardless of their respective identifiable images 210. Thereafter, the above-discussed steps 570 and 580 are performed to receive a user's selection input and then select the target device 200.

As discussed hereinbefore, the short-range wireless communication apparatus 100 of the present invention recognizes the identifiable information by capturing the identifiable image 210 through the camera unit 120 and selects the connection target device 200 from a device found corresponding to the identifiable information. In addition, the short-range wireless communication apparatus 100 of this invention gives a user much convenience in selecting the connection target device 200 and in using a short-range wireless communication function.

The above-described methods according to the present invention can be realized in hardware, firmware or as software or computer code that can be stored in a non-transitory recording medium such as a CD
ROM, a RAM, thumbnail drive, a floppy disk, a flash storage, a hard disk, or a magneto-optical disk, etc., or downloaded over a network and stored in storage, so that the methods described herein can be executed by such software using a general purpose computer, special computer, microprocessor, special processor, or in a programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

The present invention is described herein with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method for establishing a connection of a short-range wireless communication apparatus, the method comprising:
   capturing an identifiable image of a connection target device;
   recognizing, using at least one processor, identifiable information corresponding to the identifiable image;
   searching a plurality of peripheral devices using a short range wireless communication signal;
   selecting the connection target device corresponding to the identifiable information from among the searched plurality of peripheral devices; and
   connecting with the selected connection target device with the apparatus through a short-range wireless communication.

2. The method according to claim 1, wherein the apparatus is connected with the target device after receiving user confirmation.

3. The method of claim 1, wherein selecting the connection target device includes:
   determining whether the of the peripheral devices corresponding to the identifiable information is found; and
   if at least one peripheral device corresponding to the identifiable information is found, selecting the at least one peripheral device as the connection target device.

4. The method of claim 3, wherein selecting the connection target device further includes:

if the peripheral device corresponding to the identifiable information is not found, displaying all the plurality of peripheral devices for user-selection;

receiving an input to select one of the displayed plurality of peripheral devices; and selecting the connection target device corresponding to the received input.

5. The method of claim 1, wherein selecting the connection target device further includes:

determining whether at least one peripheral device corresponds to the identifiable information is found by the searching;

if the at least one peripheral device corresponding to the identifiable information is found, displaying the at least one peripheral device; and receiving an input to select one of the displayed at least peripheral device.

6. The method of claim 5, wherein selecting the connection target device further includes:

if the at least one peripheral device corresponding to the identifiable information is not found, displaying all the plurality of peripheral devices searched for via short-range communication and identified for user-selection.

7. The method of claim 1, wherein the identifiable information includes at least one of a Bluetooth address and a Bluetooth device name.

8. The method of claim 1, wherein the identifiable information includes at least one of short-range communication address and a short-range communication name.

9. The method of claim 7, wherein connecting the connection target device includes connecting the connection target device with the apparatus through Bluetooth.

10. The method according to claim 1, wherein the visually identifiable image comprises a machine readable code directly on the peripheral devices or by a sticker arranged thereon.

11. The method according to 8, wherein the short-range wireless communication comprises Near Field Communication (NFC), ZigBee, RuBee, or a wireless Local Area Network (LAN).

12. A short-range wireless communication apparatus comprising:

a camera unit configured to capture an identifiable image of a connection target device;

a control unit configured to recognize identifiable information corresponding to the captured identifiable image, to search for a plurality of peripheral devices using a short range wireless communication signal and to select the connection target device corresponding to the recognized identifiable information from among the searched plurality of peripheral devices; and a short-range communication unit configured to connect the selected connection target device with the apparatus through a short-range wireless communication.

13. The apparatus of claim 12, wherein the identifiable information is a username or alphanumeric characters on an outer surface of the plurality of peripheral devices or on a machine readable sticker arranged on peripheral devices.

14. The apparatus of claim 12, wherein the control unit is further configured to select, if at least one peripheral device corresponding to the recognized identifiable information is found, the at least one peripheral device as the connection target device.

15. The apparatus of claim 14, further comprising:

a display unit configured to display a list of the plurality of peripheral devices; and an input unit configured to receive an input of a selected one of the plurality of peripheral devices, wherein the control unit is further configured to control the display unit to display all the plurality of peripheral devices if the peripheral device corresponding to the recognized identifiable information is not found, and to select the connection target device among the displayed all plurality of peripheral devices.

16. The apparatus of claim 12, further comprising:

a display unit configured to display a list of the plurality of peripheral devices; and an input unit configured to receive an input to select one of the plurality of peripheral devices, wherein the control unit is further configured to control the display unit to display the at least one peripheral device if at least one peripheral device corresponding to the recognized identifiable information is found, and to select the connection target device among the found at least one peripheral device.

17. The apparatus of claim 16, wherein if the at least one peripheral device corresponding to the recognized identifiable information is not found, the control unit is further configured to control the display unit to display all the plurality of peripheral devices.

18. The apparatus of claim 12, wherein the identifiable information includes at least one of a Bluetooth address and a Bluetooth device name.

19. The apparatus of claim 18, wherein the short-range communication unit is further configured to connect the selected connection target device with the apparatus through Bluetooth.

20. A mobile portable terminal comprising:

a camera unit configured to provide an identifiable image of a peripheral device within a short-range communication distance;

a recognition unit configured to recognize identifiable information corresponding to a captured identifiable image; and a control unit configured to search for a plurality of peripheral devices using a short range wireless communication signal and to select a connection target device corresponding to the recognized identifiable information from among the searched plurality of peripheral devices; and an RF communication unit configured to connect the selected connection target device with the apparatus through a short-range wireless communication, the RF communication unit including short-range communication and a mobile frequency for communication with a base station.

* * * * *

UNITED STATES PATENT AND TRADEMARK OFFICE
CERTIFICATE OF CORRECTION

PATENT NO.        : 8,879,991 B2                                        Page 1 of 1
APPLICATION NO.   : 13/113473
DATED             : November 4, 2014
INVENTOR(S)       : Hyeong Seok Kim It is certified that error appears in the above-identified patent and that said Letters Patent is hereby corrected as shown below:

In The Claims

Column 8, Claim 3, Line 60 should read as follows:
--...whether any of the...--

Column 9, Claim 5, Lines 16-17 should read as follows:
--...at least one peripheral...--

Column 9, Claim 11, Line 37 should read as follows:
--...according to claim 8...--

Signed and Sealed this
Tenth Day of February, 2015

Michelle K. Lee
*Deputy Director of the United States Patent and Trademark Office*